US007573598B2

(12) United States Patent  
Cragun et al.

(10) Patent No.: US 7,573,598 B2
(45) Date of Patent: Aug. 11, 2009

(54) METHOD AND APPARATUS FOR SELECTIVELY COPYING DOCUMENTS WITH HANDWRITTEN NOTATIONS

(75) Inventors: Brian John Cragun, Rochester, MN (US); Paul Reuben Day, Rochester, MN (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 579 days.

(21) Appl. No.: 10/050,385

(22) Filed: Jan. 16, 2002

(65) Prior Publication Data

US 2003/0133156 A1 Jul. 17, 2003

(51) Int. Cl.
*G06K 15/00* (2006.01)
*G06F 3/12* (2006.01)

(52) U.S. Cl. .................. 358/1.18; 358/1.1; 358/1.6; 358/1.13

(58) Field of Classification Search ............... 382/321, 382/317, 186, 218, 219, 224, 181, 182, 183, 382/184, 185, 187, 188; 358/1.18, 1.15, 358/1.6, 1.1, 1.13, 1.16, 1.17, 1.14, 1.9, 1.11, 358/537, 540, 468, 464, 452, 474; 715/541, 715/512

See application file for complete search history.

(56) References Cited

U.S. PATENT DOCUMENTS 5,333,057 A  7/1994 Morikawa et al. ........... 358/296
5,570,435 A * 10/1996 Bloomberg et al. ......... 382/283
5,631,984 A *  5/1997 Graf et al. .................. 382/317
5,832,474 A   11/1998 Lopresti et al. ............... 707/2
5,859,935 A *  1/1999 Johnson et al. ............. 382/317
5,893,908 A *  4/1999 Cullen et al. ................. 707/5
5,982,502 A * 11/1999 Jinnai ........................ 358/296
6,028,956 A *  2/2000 Shustorovich et al. ...... 382/156
6,940,617 B2 *  9/2005 Ma et al. ................... 358/1.15
6,980,331 B1 * 12/2005 Mooney et al. ............. 358/400

OTHER PUBLICATIONS

Microsoft Word 2002 Help File: Compare Two Copies of a Document☐☐C:\Program%20Files\Microsoft%20Office\Office\1033\wdmain9.chm::/html/wohowCompareTwoVersionsOfADocument.htm.*
Microsoft Word 2002 Help File: About Adding Comments and Keeping Track of Changes☐☐C:\Program%20Files\Microsoft%20Office\Office\1033\wdmain9.chm::/html/wdconWaysCommentsChanges.htm.*
Gonzales, Rafael C. Digital Image Processing. Addison-Wesley Publishing Company, New York. 1993. pp. 465.*

* cited by examiner

*Primary Examiner*—Dov Popovici
(74) *Attorney, Agent, or Firm*—Duft Bornsen & Fishman, LLP

(57) ABSTRACT

A document and image management system that can manage handwritten comments and/or edits on conventional paper. The invention may be embodied as an enhanced photocopier adapted to locate and classify handwritten notations using optical character recognition techniques. This embodiment allows the user to select options to selectively copy only those pages with notations, to create an index of handwritten notations, to add side margin locator marks to the document, and to compare subsequent comments on different drafts.

17 Claims, 11 Drawing Sheets

| JOB PAGE # | LOCATION OF NOTATION(S) | OCR PAGE # | NOTES REGARDING THIS PAGE |
|---|---|---|---|
| 1 _306a_ | <NONE> _308a_ | <NONE> _312a_ | <NONE> _314a_ |
| 2 | <NONE> | <NONE> | <NONE> |
| 3 | 1) LINE 3, 5% FROM TOP  2) LINE 17, 55% FROM TOP _308c_ | 1 | "2 COMMENTS FOUND" _314c_ |
| 4 | <NONE> | 2 | <NONE> |
| 5 | <NONE> | 3 | <NONE> |
| 6 _306f_ | <THRESHOLD EXCEEDED> _308f_ | 3-B _312f_ | "MANY COMMENTS ON PAGE" _314f_ |
| 7 _306g_ | <NONE> _308g_ | 4 _312g_ | <NONE> _314g_ |

FIG. 3

Draft ID: _404_ Reviewer _406_ Draft No. _408_
Dept 451 Security Procedures   Tom   1

| JOB PAGE # _412_ | File Name _414_ | Reviewer Notes _416_ |
|---|---|---|
| 1 | 001.jpg | <NONE> |
| 2 | 002.jpg | <NONE> |
| 3 | 003.jpg | 1) LINE 3, 5% FROM TOP<br>2) LINE 17, 55% FROM TOP |
| 4 | 004.jpg | <NONE> |
| 5 | 005.jpg | <NONE> |
| 6 | 006.jpg | <NONE> |
| 7 | 007.jpg | <THRESHOLD EXCEEDED> |

402
410 (rows 1, 2, 7)

FIG. 4

METHOD AND APPARATUS FOR SELECTIVELY COPYING DOCUMENTS WITH HANDWRITTEN NOTATIONS

FIELD OF THE INVENTION

The present invention generally relates to document reproduction, storage, and management systems. More specifically, the present invention relates to an enhanced digital photocopier capable of detecting, selectively copying, and marking documents with handwritten notations.

BACKGROUND OF THE INVENTION

Although electronic document creation has become commonplace, the paperless office remains elusive. Many people prefer to review and edit their work on a paper hardcopy. This preference, however, requires that someone transfer all of the handwritten comments into the electronic device. For long documents, the process of scanning each page to find the comments is time consuming and error prone.

This problem is compounded in the modern workplace in which teams of employees frequently prepare and review documents. These group projects frequently require that documents be copied multiple times for distribution, for review and re-review, and to create a record of changes. Unfortunately, this process spreads the editorial comments across the multiple copies of the document. Thus, to find all of the changes and/or to retain a record of who made what changes, someone must sort through multiple copies of the document, then extract those pages with comments, then feed those pages into the copier and/or enter the changes into a computer, then re-insert the pages back into the originals. This process is time consuming and, invariably, results in some lost comments. Another problem intensified by these group projects is that, as documents are serially reviewed, it becomes difficult to identify and focus upon new comments.

One partial solution to these problems, described in U.S. Pat. No. 5,893,908 to Cullen et al., provides automatic archiving of documents and alerts a digital copier when a document to be copied already exists electronically within a database. Drawbacks with this system, however, include that it does not provide for collating of documents with changes, indexing changes as part of copy job, creating side markings as part of a copy job, or comparison of reviewer comments and handwritten additions in the copier job compared to archived documents.

Another partial solution to these problems, described in U.S. Pat. No. 5,832,474, to Lopresti et al., is a document browser for electronic filing systems. The user may write notes on a page with an electronic pen, and later search for those notes using the approximate ink matching (AIM) techniques. This system, however, does not allow reviewers to work with plain paper and with conventional writing instruments, such as a pencil or ballpoint pen. This system also does not provide copy collating, an index to hand written markings as part of the copy output, side markings on the edge of the paper, or provide automatic comparison at copy time of hand written differences in archived documents compared to documents being copied.

Accordingly, there is considerable interest in document and image management systems that can help manage handwritten comments and edits created by reviewers with conventional writing instruments on plain paper.

SUMMARY OF THE INVENTION

The present invention provides a document and image management system that can locate, sort, and mark handwritten comments and/or edits on conventional paper. One embodiment of the present invention is an enhanced photocopier adapted to locate and classify handwritten notations using optical character recognition techniques. This embodiment allows the user to select options to selectively copy only those pages with notations, to create an index of handwritten notations, to add side margin locator marks to the document, and to compare comments on different drafts.

Accordingly, one aspect of the present invention is a method for managing handwritten notations on paper documents. One embodiment of this method comprises capturing a first image of a first paper document and detecting whether the first image contains a handwritten notation. This embodiment may further comprise printing the first image only if the first image contains at least one handwritten notation, generating and printing location summary information for the handwritten notation, printing the location information, superimposing a margin mark onto the first image adjacent to the handwritten notation, and comparing the first image to a second image stored in memory. This method may also be embodied as a computer program product.

Another aspect of the present invention is an apparatus for copying paper documents containing handwritten notations, comprising a scanner for caputuring an image of a first document, and a processor configured to determine whether the image of the first document contains a handwritten notation. The processor may be further configured to superimpose a margin mark adjacent to the handwritten notation, print the first image only if the image contains at least one handwritten notation, and to compare the image to an earlier version stored in an attached memory unit.

Still another aspect of the present invention is a system for managing handwritten comments on multiple copies of a document. One embodiment of this system comprises a scanner for caputuring a digital image of a page of a document, a programmable processor coupled to the photocopier, and a printer coupled to the programmable processor. The programmable processor in this embodiment is programmed to detect handwritten comments on the at least one page and to selectively generate notation summary information for the page, superimpose a margin mark adjacent to the handwritten notation, and print the image of the page only if the page includes at least one handwritten comment.

One feature and advantage of the present invention is that it provides notation comparison and summary capacity for notations written on conventional paper with conventional writing instruments. Another feature and advantage of the present invention is that it may be easily integrated into a variety of standard office equipment, such as photocopiers, facsimile machines, and the like. These and other features, aspects, and advantages will become better understood with reference to the following description, appended claims, and accompanying drawings.

BRIEF DESCRIPTION OF THE DRAWINGS

FIG. 3 is a database entry suitable for storing notation information.

FIG. 4 is a database entry suitable for storing revision information.

DETAILED DESCRIPTION

Figure 1:
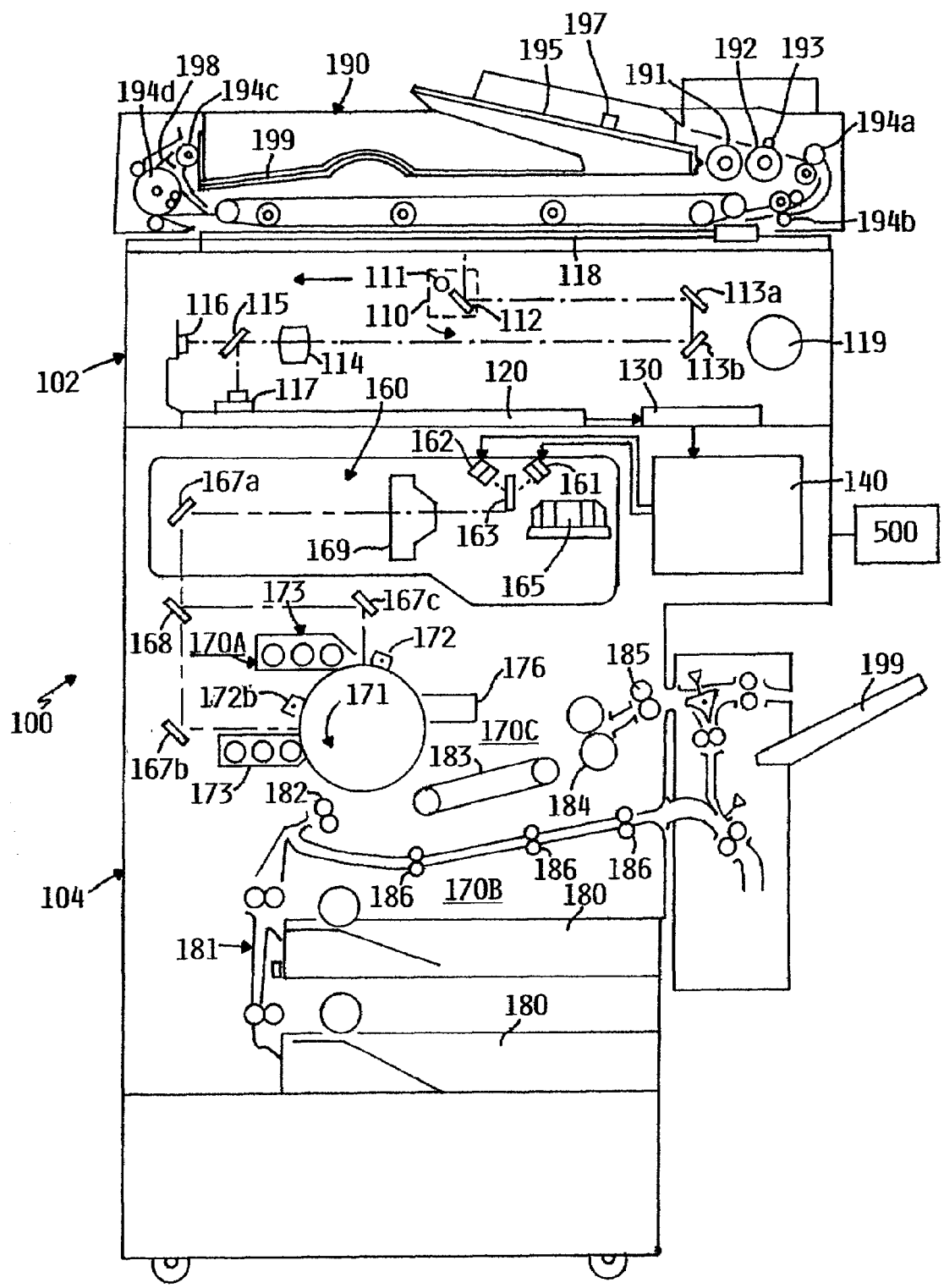
FIG. 1 is a sectional view of a photocopier suitable for use with the present invention.

FIG. 1 depicts a digital, color, and double-side photocopier 100 embodiment suitable for use with the present invention. This photocopier 100 embodiment generally comprises an image-reading unit 102 and a printing unit 104. The image-reading unit 102 includes a scanning system 110, an image signal processor 120, and memory 130. The photocopier 100 embodiment in FIG. 1 also includes a document-transporting unit 190 and an operation panel 500.

The scanning system 110 takes a digital image of each page in the document. In this embodiment, the scanning system 110 includes an exposure lamp 111, a first mirror 112 that reciprocates underneath a document glass table 118, a second mirror 113a and a third mirror 113b, a condenser lens 114, a dichroic mirror 115, two photovoltaic elements 116 and 117 (such as a Charged Coupled Device array), and a scan motor 119.

The printing unit 104 consists of a developing/transferring system 170A, a transporting system 170B, and a fixing system 170C. The developing/transferring system 170A receives the digital data produced by the scanning system 110 and converts the data into an image on a photosensitive drum 171. The developing/transferring system 170A also includes a charger 172, a developing device 173 containing a developer made of toner and a carrier, a printing processor 140, and an optical system 160. The optical system 160, in turn, comprises two semiconductor lasers 161 and 162, a dichroic mirror 163 for synthesizing the light of the two beams, a polygonal mirror 165 for deflecting the synthesized beam light, a primary lens 169, a reflecting mirror 167a, a dichroic mirror 168 for separating the synthesized beam light into the light of the original two beams, and two reflecting mirrors 167b and 167c.

The transporting system 170B in this embodiment includes paper cassettes 180 containing blank paper sheets, a copy sheet guide 181, a pair of timing rollers (hereinafter, simply referred to as the timing roller) 182, a transporting belt 183, and three pairs of rollers 186 for transporting the copy sheet to the developing/transferring system 170. The fixing system 170C includes a pair of fixing rollers 184 for transporting the copy sheet while fixing the developed image onto the copy sheet through the thermocompression bonding, a pair of discharge rollers 185 for discharging the copy sheet into the copy tray 199.

The processor 120 includes a combination of hardware, software, and/or firmware adapted to act as an Analog-to-Digital converter, a shading correcting device, a magnification ratio processing device, a quality correcting device, and a color discriminating device for discriminating the color of a pixel based on the two image signals. The processor 120 is also adapted to perform additional required processing, such as shading, quality, and magnification ratio correction, and to output the resulting digital data to the memory unit 130.

The document transporting unit 190 includes a feeding roller 191, a separating roller 192, a separating pad 193, a pair of intermediate rollers 194a, a pair of resist rollers 194b, a transporting belt 196, a set of reversing rollers 194d, a switching claw 198, a discharge roller 194c, a document tray 195, and a catch tray 199, and a document sensor 197.

In operation, the document transporting unit 190 transports a document across the document glass table 118, where it is scanned by the scanning system 110. The document transporting unit discharges directly into the catch tray 199 when the front side alone is to be copied, or it is reversed and forwarded to the document glass table 118 again by means of the reversing roller 194d and switching claw when both of the sides are to be copied. In this embodiment, the document-transporting unit 190 may operate automatically to allow the user to scan a plurality of documents.

The exposure lamp 111 directs light against the document as it passes across the glass table 118. The light reflects off the document into the dichroic mirror 115. The dichroic mirror 115 receives the light that reflected off the documents and selectively reflects those portions of the light of a certain color (e.g., red), while transmitting those portions of the light having complementary colors. The photovoltaic elements 116 and 117 convert light of non-specific color (i.e., black) and the specific color (e.g., red) into respective image signals. These signals are processed as necessary by the processor 120 and stored in the memory unit 130.

The charger 172 generates a positive charge on the surface of the photosensitive drum 171. The optical system 160 guides two light beams from semiconductor lasers 161 and 162 to respective points of exposure on the photosensitive drum 171, which causes those portions of the drum 171 struck by the light to loose their positive charge. Toner is then applied to the drum 171, which sticks to the remaining positively charged areas. Next, the transporting system 170B selects a single sheet of paper from the paper cassettes 180, generates a positive charge on its surface, and causes the coated drum 171 to spin into contact with the paper. The toner particles stick to the paper and are fixed in place with the fixing rollers 184.

FIGS. 2A-2G depict one method of using the photocopier 100 in FIG. 1. This method will be described with reference to an example document consisting of a cover page, followed by a table of contents page, followed by five typewritten pages (numbered 1, 2, 3, 3-b, and 4). A reviewer has made handwritten notations on copy job pages 1 and 6 (i.e., typewritten numbers 1 and 3-b). However, those skilled in the art will appreciate that the methods and systems of the present invention apply equally to any document.

In general, the routines executed to implement the embodiments of the present invention, whether implemented as part of an operating system of the photocopier 100, or as a hardware or software module, may be referred to herein as a "program." The computer program typically is comprised of a multitude of instructions that will be translated into a machine-readable format and hence executable instructions. Also, programs are comprised of variables and data structures that either reside locally to the program or are found in memory on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2A:
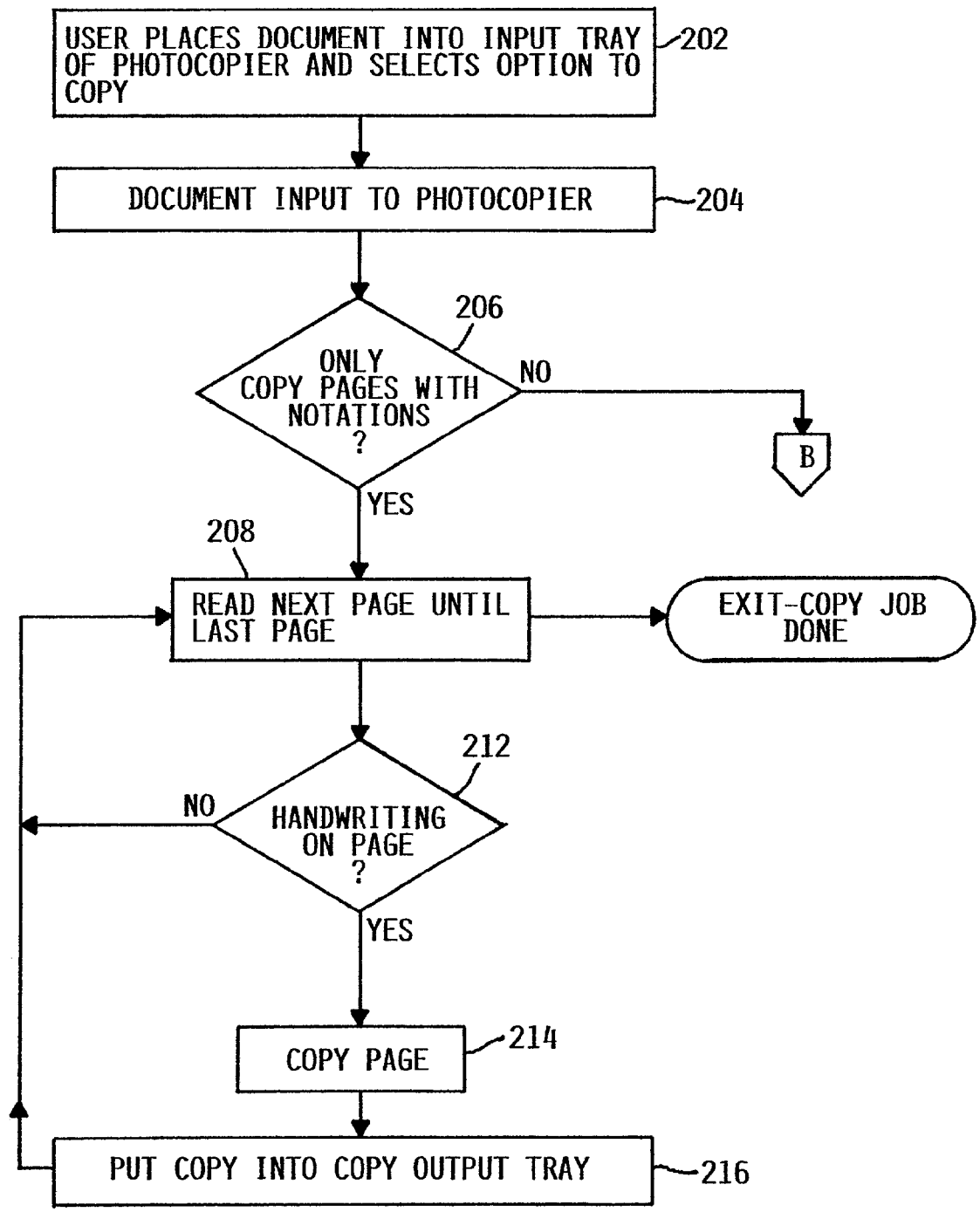
FIGS. 2A-2G illustrate one method of using the photocopier in FIG. 1.

At blocks 202-204 in FIG. 2A, a user places the document into the document tray 195 of the photocopier 100 and selects an option to make copies of only those pages with handwritten notations. One suitable method by which the user may make this selection is to press the appropriate portion of the operational panel in FIG. 5. If the photocopier 100 is only to make copies of pages with handwritten notations, the photocopier 100 proceeds to block 208, otherwise the photocopier 100 proceeds to block 220 in FIG. 2B.

At block 208, the document-transporting unit 190 selects the first sheet of paper in the document and automatically passes that sheet of paper across the glass table 118. The scanning system 110 then converts the pattern (e.g., typewritten characters, handwritten notations, etc.) on the sheet of paper into digital data. This digital data is then stored in the memory unit 130 in a convenient digital image format, such as the Xerox Image File format ("XIF"), the Joint Photographic Experts Group format ("JPEG"), the Tagged Image File format ("TIFF"), and the like.

At block 212, the processor 120 detects whether or not the digital data contains any notations, comments, or the like from reviewers. That is, the pattern in this example document generally consists of dark marks on a light background. The photocopier 100 analyzes each of the dark marks on a page and classifies the mark as either a typewritten character or as a handwritten notation. One suitable mechanism for identifying handwritten notations and/or distinguishing handwritten notations from the typewritten characters is to utilize optical character recognition ("OCR") technology. In these embodiments, anything not identifiable by the OCR system as a typewritten character would be classified as a handwritten notation. More detail on OCR technology may be found in *Computer Text Recognition and Error Correction*, (Sargur N. Srihari ed, IEEE Computer Society Press 1985) and G. J. Awcock and R. Thomas, *Applied Image Processing*, (McMillan Press, Ltd., 1995), which are herein incorporated by reference.

If the processor 120 does not detect handwritten notations at block 212, the photocopier 100 feeds the page without copying it, proceeds to block 208, and processes the next sheet of paper in the document; otherwise, the photocopier 100 proceeds to block 214. At block 214, the photocopier prints a copy of the page with the handwritten notations. At block 216, the photocopier 100 puts the copied page into the output tray 199 and then repeats blocks 208-214 until the photocopier 100 has scanned each sheet of paper in the document and analyzed it for the presence of handwritten notations.

Figure 2B:
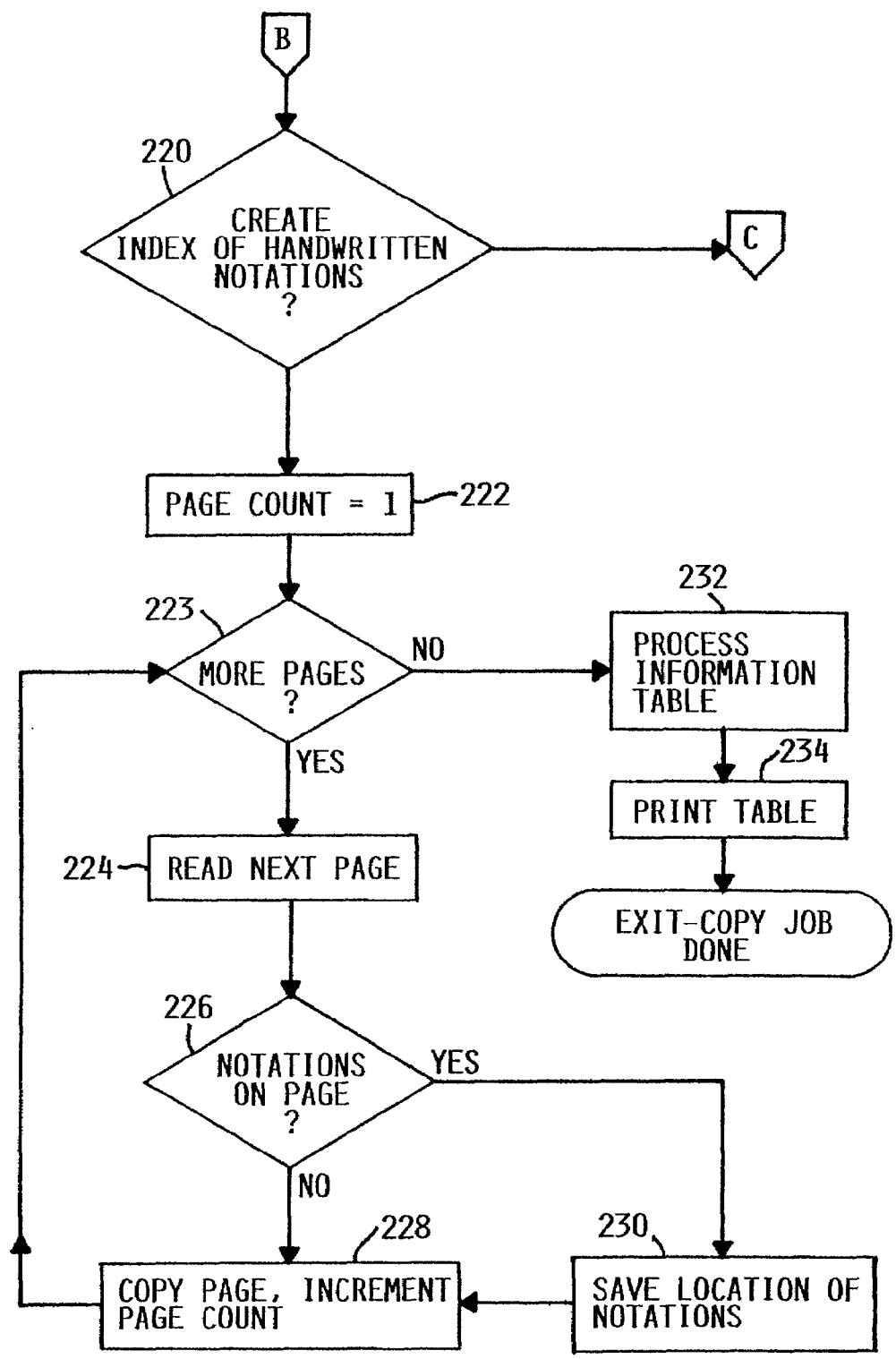

Referring now to FIG. 2B, the user selects an option at block 220 to create an index to the handwritten notations. One suitable method of receiving this selection is for the photocopier 100 to prompt the user to press the appropriate portion of the operational panel shown in FIG. 5. If the photocopier 100 is to create an index, it proceeds to block 222; otherwise the photocopier 100 proceeds to block 240 in FIG. 2C.

At block 222, the photocopier 100 initializes a "page count" variable to 1 and stores this value in memory 130. The document-transporting unit 190 then selects the first sheet of paper in the document and automatically passes that sheet of paper across the glass table 118 at blocks 223-224. This causes the photocopier to convert the pattern on the sheet of paper into a digital data, which is then stored in the memory unit 130 in an appropriate image format. Next, at block 226, the photocopier detects whether or not there were any handwritten notations on the scanned page using, for example, OCR technology. If the photocopier does not detect any notations, it prints the stored image of the page using the printing unit 104 and increments the page count variable at block 228.

If, however, the photocopier 100 did detect handwritten notations at block 230, it collects information about the notation and stores it in an appropriate data structure in memory 130, such as that shown in FIG. 3. More specifically, FIG. 3 shows a plurality of database entries 302*a*-302*g* for the example document. Each database entry 302 comprises a copy job page number field 306*a*-306*g*, a location of handwritten notations field 308*a*-308*g*, an OCR detected page number field 312*a*-312*g*, and a notes field 314*a*-314*g*. The copy job page number field in this embodiment identifies a particular page in the document, as referenced from the first page processed by the photocopier 100. The OCR detected page number identifies a particular page as referenced by the document's internal page number. The internal page number, in turn, may be identified using conventional optical character recognition techniques. Thus, for the example document, the copy job number field 306*f* would contain a "6" and the OCR detected page number field 312*f* would contain a "3-b."

With continuing reference to FIG. 3, the location of handwritten notations field 308 contains the position of each handwritten notation on that page. This position information may be identified in any convenient manner, such as using the closest line number or as a percentage of the distance from the top of the page to the bottom of the page. Some embodiments may also use a maximum-locations-to-be-stored threshold. If a photocopier 100 embodiment that uses a maximum-locations-to-be-stored threshold detects more notations on a page than a preset number (typically 2-4), the photocopier 100 replaces the actual location information with a "threshold exceeded" indicator, such as that shown in location field 308*f*.

The notes field 314 in this embodiment contains a text string that may be used to print a summary document at block 234. This string may be a simple message like "2 comments found" on the page. In embodiments using a maximum-locations-to-be-stored threshold, the photocopier 100 may store a "many comments on this page" indicator in the notes field 314 when the threshold is exceeded.

Referring again to FIG. 2B, the photocopier then repeats the actions associated with blocks 223-230 until it has scanned and analyzed each page in the document. After completing this process, the photocopier 100 then formats and prints the table in FIG. 3 on a separate sheet of paper at block 234.

Figure 2C:
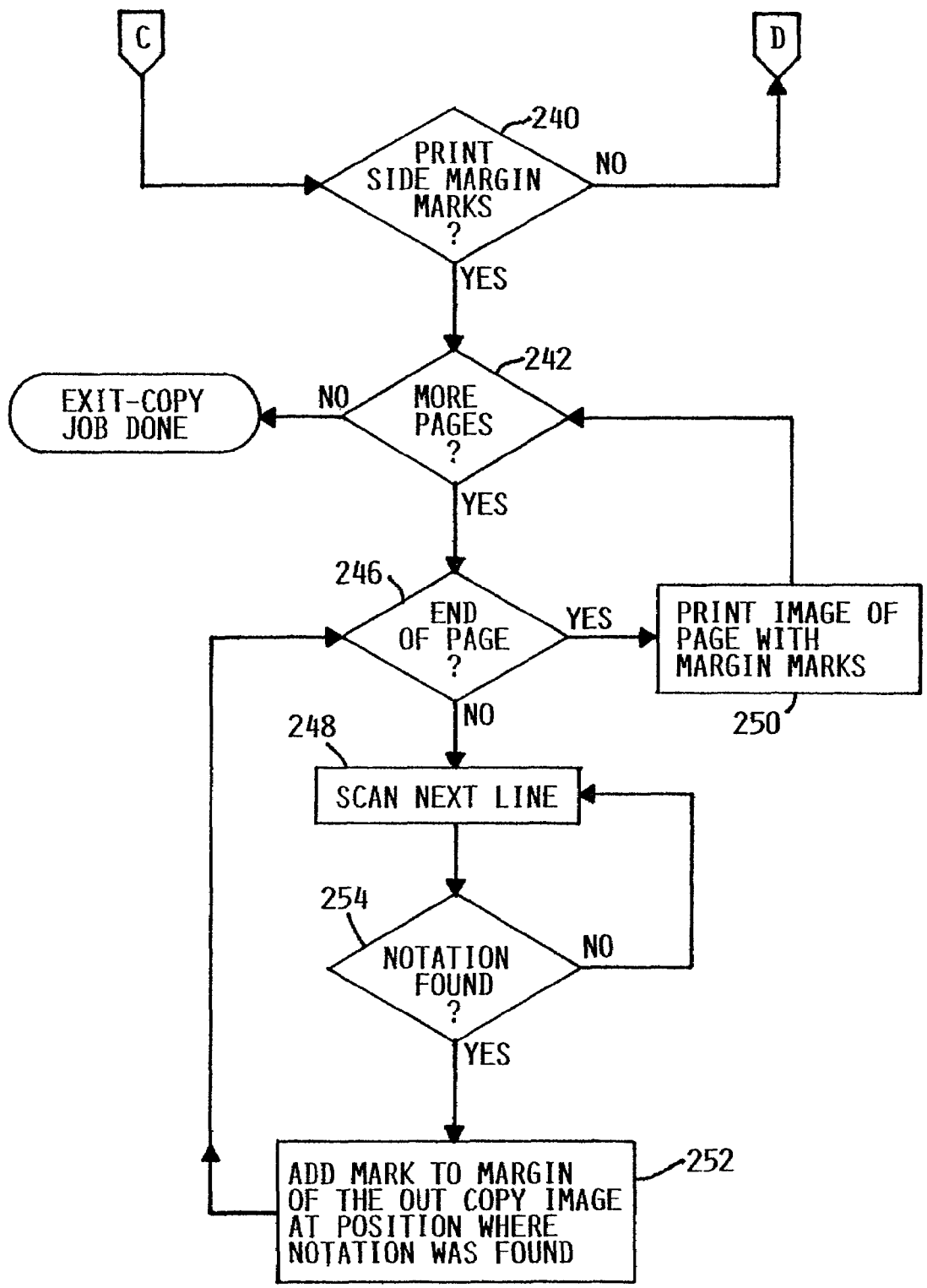
Figure 2D:
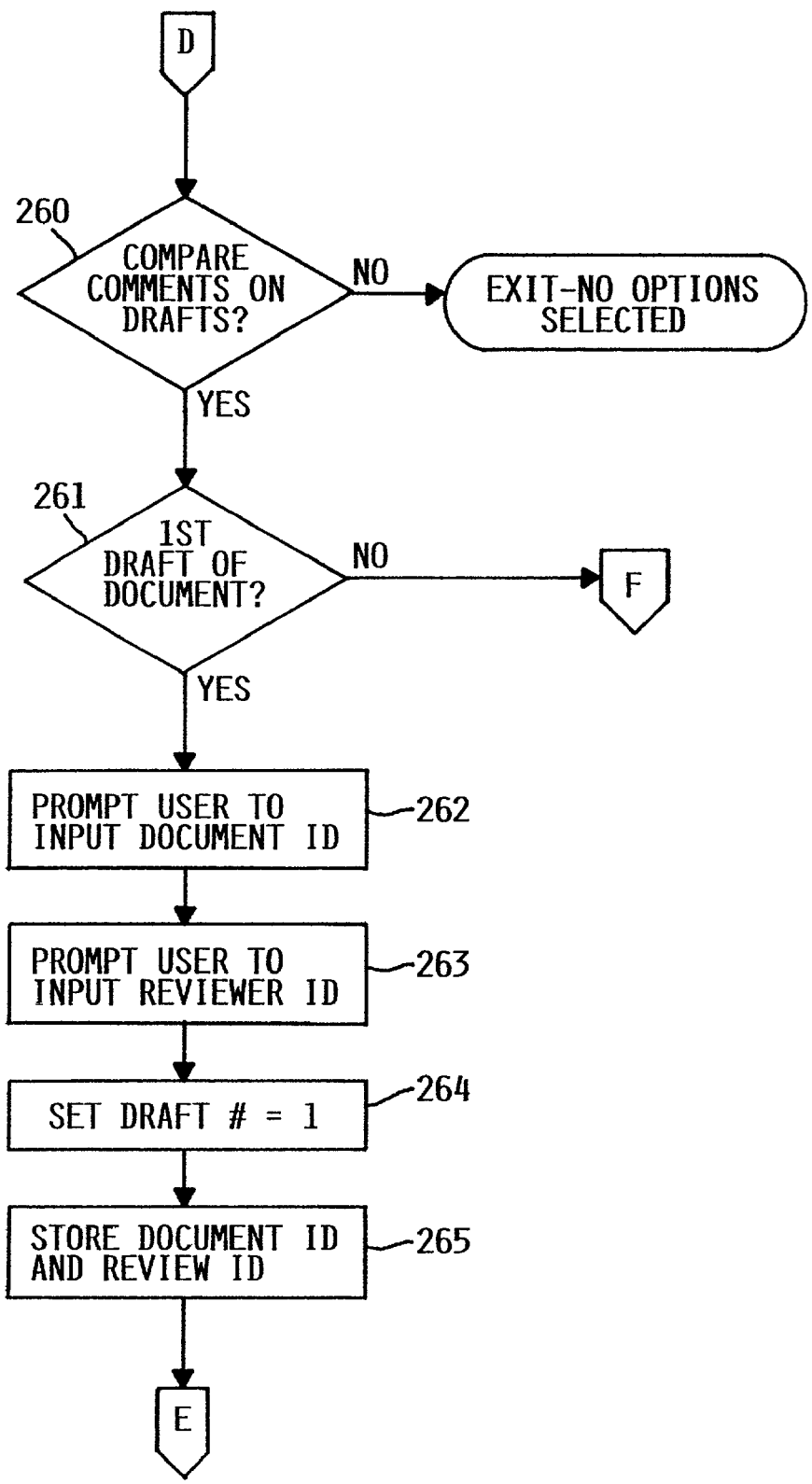
Figure 5:
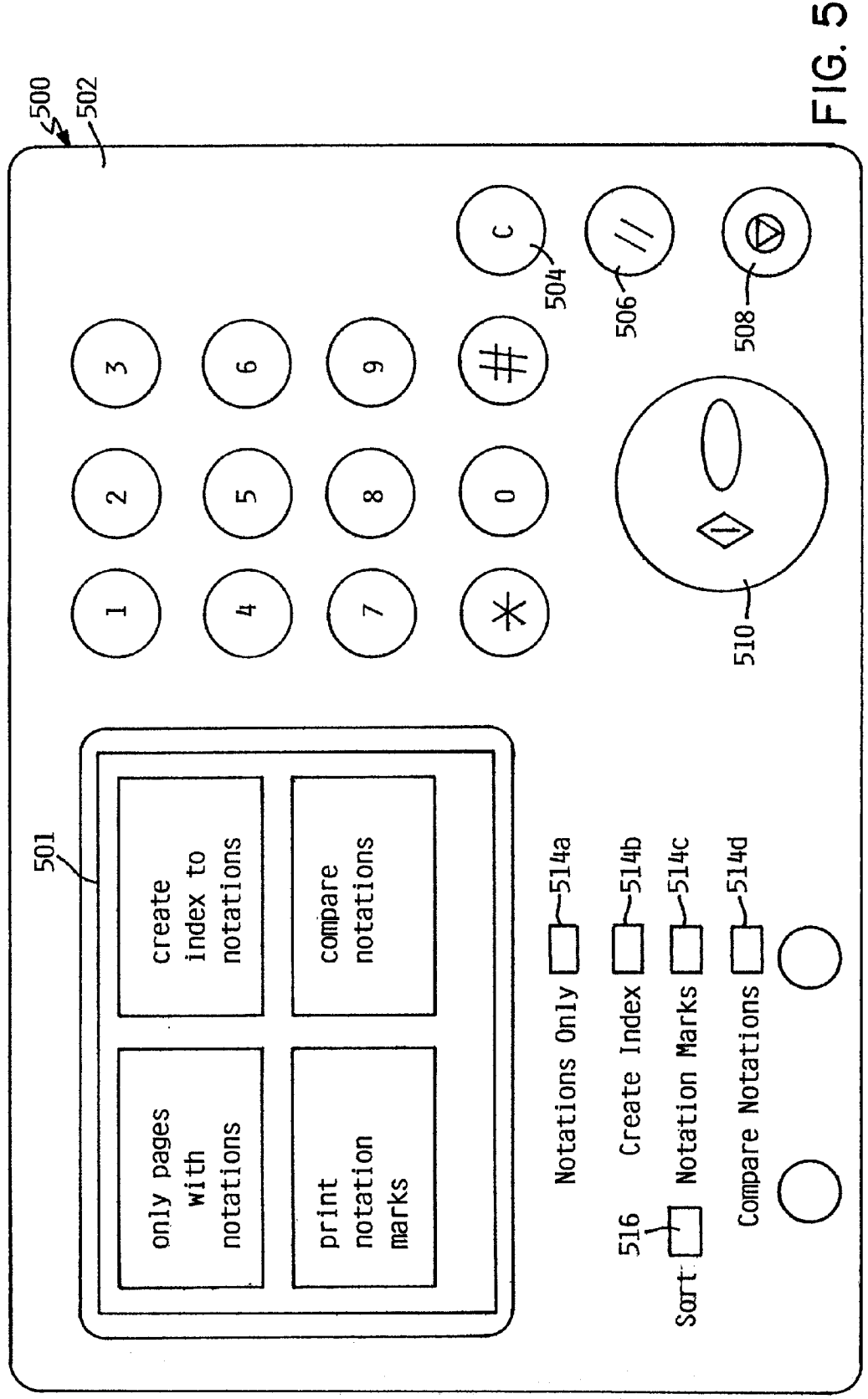
FIG. 5 is top plan view of an operational panel suitable for use with the photocopier in FIG. 1.

With reference to FIG. 2C, the user can select an option to print notation location marks in the document's side margin at block 240 by touching the appropriate portion of the operational panel shown in FIG. 5. If the photocopier 100 is to create and print the marks, the photocopier 100 proceeds to block 242, otherwise the photocopier 100 proceeds to block 260 in FIG. 2D. At block 242, the photocopier 100 starts processing the first page in the document.

At blocks 246-254, the photocopier superimposes a margin mark over the image of the page at the approximate vertical position of any notations it detects. Thus, for example, if the photocopier detects a particular notation between lines 7 and 8 of the first typewritten page, the photocopier 100 will superimpose a small square, check mark, vertical line, or the like, in the page margin between lines 7 and 8. One suitable method of creating these margin marks is to first scan a small fraction of the page at a time (e.g., one line or 2%) starting from the top of the page at block 248, then detect whether there are notations in that portion of the page at block 254. At block 252, if the photocopier 100 finds any notations, it superimposes a margin mark over the digital image stored in the memory 130 at the current vertical location. The photocopier 100 then returns to blocks 246-248, and repeats the actions associated with blocks 252-254 on the next small fraction of the page until the photocopier finishes the entire page. After completing the entire page, the photocopier 100 prints a copy of the page at block 250, with the margin marks superimposed thereon, and outputs the page into the output tray 199. The photocopier 100 then repeats the actions associated with blocks 246-254 on the next page until the photocopier 100 finishes the entire document.

With reference to FIGS. 2D-2G, the user selects an option to compare notations on different drafts at block 260 by, for example, touching the appropriate portions of the operational panel shown in FIG. 5. If the user does not direct the photocopier 100 to compare notations, the photocopier 100 prints a standard copy of the document. If, however, the user directs the photocopier 100 to compare notations, the photocopier 100 prompts the user at block 261 to identify whether the document is the original draft. If the document is the original draft, the photocopier 100 then prompts the user to identify the document at block 262 (e.g., enter a document identification number or file name). At blocks 263-264, the photocopier prompts the user to identify the reviewer (e.g., enter the reviewer's name) and sets a draft number variable equal to 1.Suitable methods of receiving this information include having the user enter this information using the operational panel shown in FIG. 5 and using OCR techniques to read the information off a cover page or the like. At block 265, the photocopier creates a new file or a new database entry for this document containing the document identification information, the reviewer identification information, and the draft number. The photocopier then proceeds to block 270 in FIG. 2E.

Figure 2E:
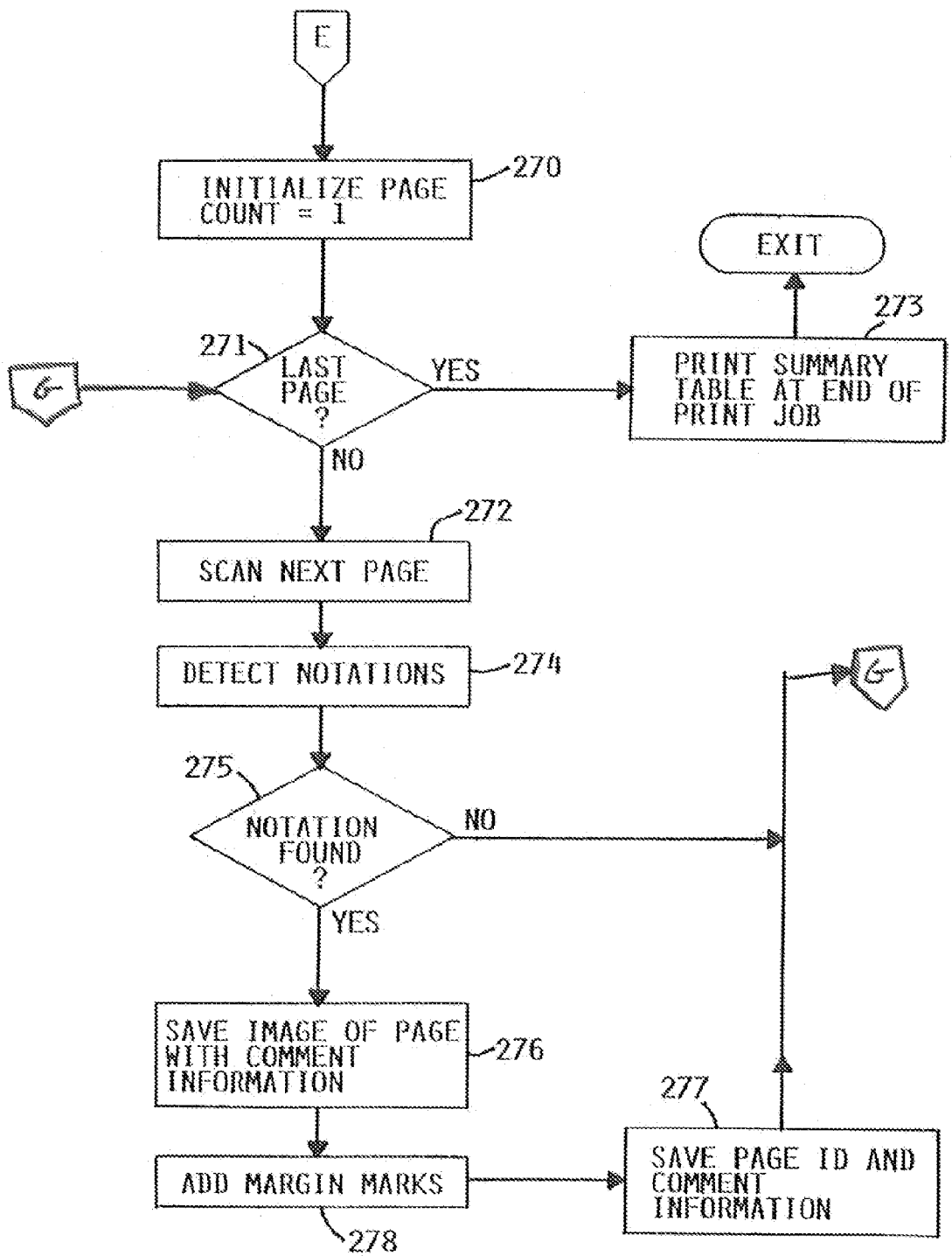

At blocks 270-272 in FIG. 2E, the photocopier 100 initializes the page count and scans the first page of the document. At block 274, the photocopier 100 detects whether or not the page has any handwritten notations using the OCR methods previously described. If the photocopier finds at least one notation, the photocopier 100 saves an image of the page at block 276 into memory 130 and/or into an attached network storage device, such as a Shark Enterprise Storage Server available from IBM Corporation. The photocopier may also add margin marks to the image at block 278 using the techniques described with reference to FIG. 2C. Next, at block 277, the photocopier 100 stores the identification information collected at blocks 262-264 and the location information collected using the techniques of FIG. 2B into a suitable data structure, such as that shown in FIG. 4.

FIG. 4 shows a database entry 402 for storing identification information and location information. Each database entry 402 in this embodiment comprises a draft identification field 404 for the document identification information entered by the user in block 262, a reviewer name field 406 for the reviewer identification information entered by the user in block 263, a draft number field 408 for the draft number set at block 264, and a series of page information entries 410. Each page information entry 410 includes a page number field 412 containing information for identifying a particular page in the document, as referenced from the first page processed by the photocopier 100; an image file name field 414 for storing the location at which the page's image was stored at block 276; and a notation location field 416 that stores the position of each handwritten notation on that page.

Once the photocopier finishes the actions in blocks 271-278 for each page in the first draft of the document, the photocopier 100 formats the database entry 402 into a table and prints the table at block 273.

Figure 2F:
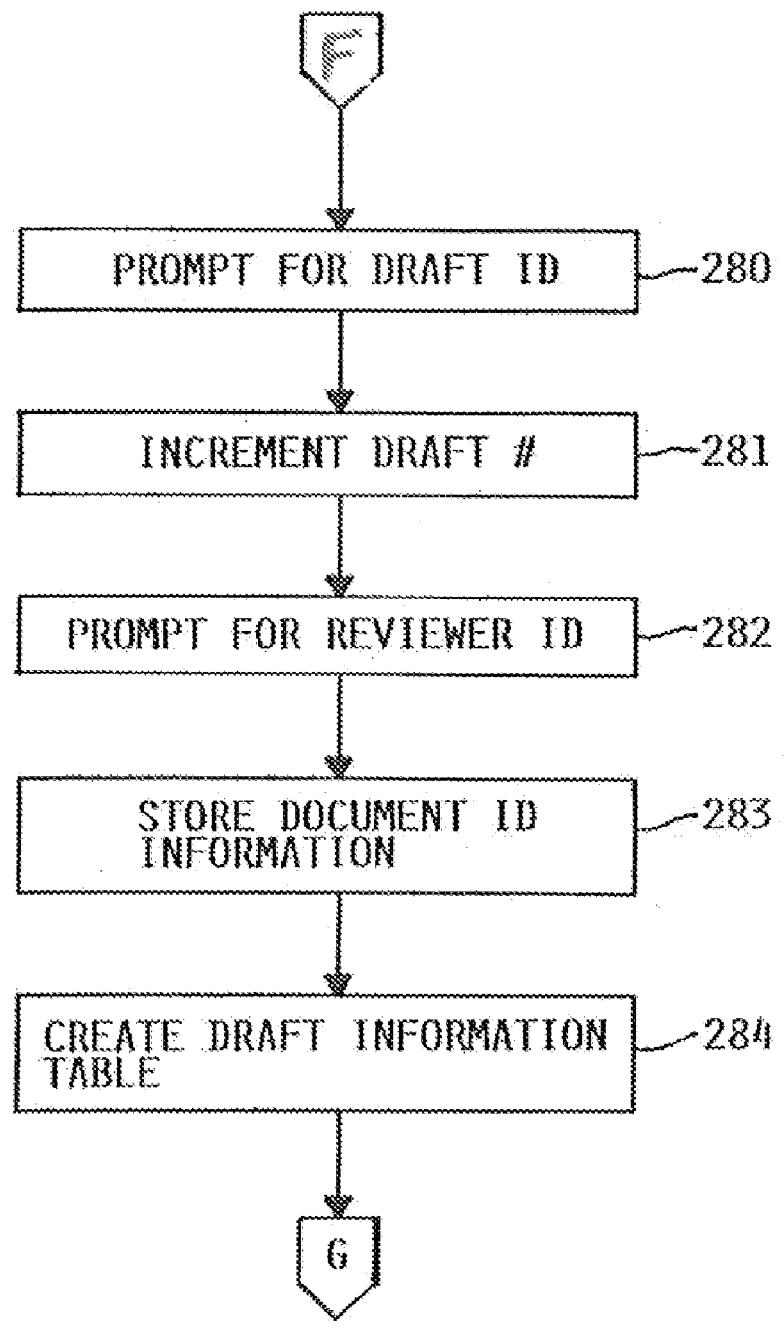

Referring to FIG. 2F, if the user indicated at block 261 that the draft to be analyzed was not the first draft of the document (i.e., a 2nd or revised draft), the photocopier 100 then prompts the user at block 280 for the document's identification information (i.e., asks the user to enter the document's file name) and/or displays to the user a selection of files stored on the network storage device. The photocopier then increments the draft number at block 281. Next, at block 282, the photocopier 100 prompts the user to enter the reviewer's name. At block 283, the photocopier performs the actions associated with blocks 271-278 on this draft. At block 284, the photocopier 100 stores all the information collected in blocks 280-283 in the network storage device using the database entry described with reference to FIG. 4.

Figure 2G:
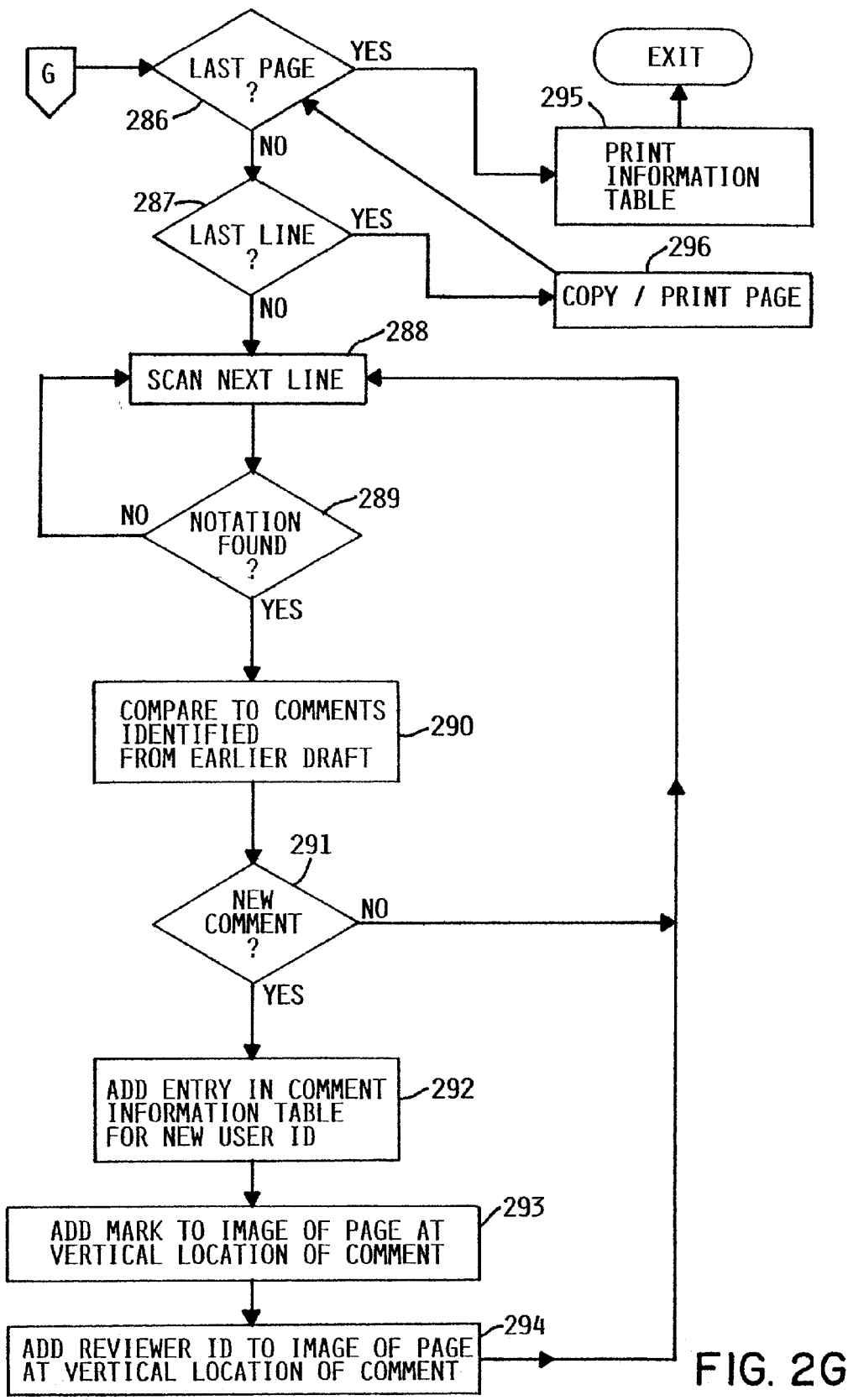

Referring to FIG. 2G, the photocopier 100 begins to scan the first page of the document line by line at blocks 286-288. At block 289, the photocopier analyzes the scanned portion of the document to determine whether or not it contains handwritten notations. If the scanned portion contains notations, the photocopier then compares the scanned portion with the equivalent portion in the previous version of the document to determine whether or not the notation is new. That is, after the photocopier 100 classifies a mark on the page as a notation, it looks to a version of the document stored in the attached network storage device to see if the previous version contains the same notation. If the notation is in the previous version, the photocopier 100 returns to block 288, where it scans the next portion of the document. If the notation is new, at blocks 292-293, the photocopier 100 adds the notation's location in the database entry created at block 284 and superimposes a margin mark over the page image using the techniques described with reference to FIG. 2C. At block 294, the photocopier 100 superimposes the review's name over the image adjacent to margin mark created in block 293. The photocopier 100 then repeats the actions associated with blocks 286-294 until it analyzes each section of each page in the document. After completing this task, the photocopier formats and prints the information table described with reference to FIG. 4 onto an additional sheet of paper.

FIG. 5 shows an operational panel embodiment 500 suitable for use with the present invention. The operation panel 500 is attached on top of the photocopier 100 for the manual input and display of copying conditions. It comprises a liquid crystal touch panel 501 for receiving user input, such as the desired copy options, document and reviewer identification information, and the like. The operational panel also comprises a 10-key keypad 502 for setting a desired number of copies and entering identification information; a clear key 504 for clearing a previously set number of copies; a panel reset key 506 for clearing all previously set conditions; a stop key 508 for stopping the copying operation; a start key 510 for starting the copying operation; light emitting diodes ("LED") 514a-514d for indicating in what copying mode the photocopier 100 is currently set; and an electronic sorting mode selecting key 516 for selecting an electronic sorting mode. Users can set the copy mode by touching the appropriate portion of the touch panel 501.

Although the present invention has been described in detail with reference to certain examples thereof, it may also be embodied in other specific forms without departing from the essential spirit or attributes thereof. For example, the present invention and components thereof are capable of being distributed as a program product in a variety of forms, and apply equally regardless of the particular type of signal bearing media used to actually carry out the distribution. Examples of suitable signal bearing media include: recordable type media, such as floppy disks and CD-RW disks, CD-ROM, DVD, and transmission type media, such as digital and analog communications links. Those skilled in the art will appreciate that the present invention may also perform combinations of the options described in FIGS. 2A-2G in the same print job. Thus, for example, the user may combine the selective copying option described in FIG. 2A with the option to print margin marks described in FIG. 2B. The present invention can also be used to locate, index, and selectively copy items other than handwritten notations. In addition, although the present invention has generally been described with reference to a photocopier 100 and a multipage paper document, it can be used with other office equipment, such as scanners, facsimile machines, and the like, and can be used with other types of documents.

Embodiments of the present invention may also replace or supplement the OCR techniques described in FIG. 2 by comparing different versions of the document. That is, these embodiments would compare the most recently scanned version of the document to an older version of the document stored in the network storage device. Markings in the newer version that were not present in the older version will be classified as a notation. Another method that may used to distinguish and/or help distinguish notations is to utilize color information. In these embodiments, the reviewers will make their notations using a writing instrument that produces markings of a different color than the typewritten text. These photocopier 100 embodiments will classify markings made in the selected color as a notation. Thus, for example, if a reviewer makes his or her notations using a red marker, the photocopier 100 will classify all red colored marks as notations. Embodiments using these subtractive and/or color-based techniques may be particularly desirable because they will be able to distinguish between a notation and a drawing, figure, or chart.

The accompanying figures and this description depict and describe embodiments of the present invention, and features and components thereof. Accordingly, it is desired that the embodiments described herein be considered in all respects as illustrative, not restrictive, and that reference be made to the appended claims for determining the scope of the invention.

What is claimed is:

1. A method for managing paper documents with handwritten notations; comprising:
    receiving a plurality of copies of a paper document, wherein each copy of the document comprises a plurality of pages and wherein at least some of the plurality of pages in each copy have handwritten notations thereon;
    capturing a first image of a page from a first copy of the paper document;
    detecting whether the first page contains handwritten notations;
    capturing a second image of the page from a second copy of the paper document;
    detecting whether the second page contains handwritten notations;
    generating notation summary information, comprising:
        printing the first image only if the first page contains at least one handwritten notation; and
        printing the second image only if the second page contains at least one hand written notation.

2. The method of claim 1, wherein detecting whether an image contains handwritten notations comprises using optical character recognition to detect typewritten characters.

3. The method of claim 2, further comprising generating location information for the handwritten notation.

4. The method of claim 3, further comprising printing the location information.

5. The method of claim 4, further comprising storing the location information in a memory.

6. The method of claim 3, further comprising superimposing a margin mark onto the first image adjacent to the handwritten notation.

7. The method of claim 1, wherein the second copy comprises the first copy with additional handwritten notations.

8. The method of claim 7, wherein detecting the additional handwritten notations comprises comparing the first image to the second image.

9. The method of claim 1, wherein detecting whether the first image contains handwritten notations comprises scanning a first copy of the first image, storing the first copy of the first image in a storage device, scanning a second copy of the first image, and comparing the second copy of the first image to the first copy of the first image.

10. The method of claim 1, wherein detecting whether the first image contains handwritten notations comprises detecting color differences in the first image.

11. A copying apparatus for documents containing handwritten notations, comprising:
    a scanner for capturing images of a page from a plurality of drafts of a document; and
    a processor configured to determine whether each captured page contains a new handwritten notation and configured to print the captured image only if the captured image contains at least one new handwritten notation.

12. The apparatus of claim 11, wherein the determination is performed using optical character recognition.

13. The apparatus of claim 11, wherein the processor is configured to superimpose a margin mark adjacent to the handwritten notation.

14. The apparatus of claim 11, wherein the processor is configured to generate notation summary information for the document.

15. The apparatus of claim 11, wherein the processor is configured to compare an image of a page from a first draft with the same page from a second draft.

16. A photocopier for managing handwritten comments on multiple copies of a document, comprising:
    (a) a scanner for capturing digital images of multiple copies of a document, wherein each copy of the document comprises a plurality of pages and wherein at least some of the plurality of pages in each any have handwritten notations thereon;
    (b) a programmable processor coupled to the scanner; and
    (c) a printer coupled to the programmable processor;
    wherein the programmable processor is programmed to detect handwritten comments on the least one of the plurality of pages and to selectively:
        determine if the handwritten comment is new;
        generate notation summary information for the page based on the detection;
        superimpose a margin mark adjacent to the handwritten comment; and
        print the image only if the page includes at least one handwritten comment.

17. A computer program product, comprising:
    a program configured to perform a method of managing paper documents with handwritten notations, comprising:
        (a) receiving a plurality of copies of a paper document, wherein each of the document comprises a plurality of pages and wherein at least some of the plurality of pages in each copy have handwritten notations thereon;
        (b) capturing a first image of a page selected from a first copy in the plurality of copies;
        (c) detecting whether the first image contains handwritten notations;
        (d) capturing a second image of the page selected from a second copy in the plurality of copies;

(e) detecting whether the second image contains handwritten notations;
(f) generating notation summary information, comprising:
 printing the first image only if the first image contains at least one handwritten notation; and
 printing the second image only if the second image contains at least one handwritten notation; and
a tangible computer readable media hearing the program.

* * * * *

UNITED STATES PATENT AND TRADEMARK OFFICE
CERTIFICATE OF CORRECTION

PATENT NO. : 7,573,598 B2
APPLICATION NO. : 10/050385
DATED : August 11, 2009
INVENTOR(S) : Cragun et al.

It is certified that error appears in the above-identified patent and that said Letters Patent is hereby corrected as shown below:

At column 10, line 58, please correct "wherein each of the document" to read "wherein each copy of the document".

Signed and Sealed this

First Day of December, 2009

David J. Kappos
*Director of the United States Patent and Trademark Office*